Feb. 27, 1962 F. RODIS ET AL 3,023,083
PROCESS FOR PRODUCING AN ALKALI PHOSPHATE FROM
AN AQUEOUS ORTHO-PHOSPHATE
Filed May 27, 1957

INVENTORS
*Franz Rodis,*
*Gerhard Hartlapp,*
*& Klaus Beltz*
BY *Connolly and Hutz*
THEIR ATTORNEYS

United States Patent Office 3,023,083
Patented Feb. 27, 1962

3,023,083
PROCESS FOR PRODUCING AN ALKALI PHOSPHATE FROM AN AQUEOUS ORTHO-PHOSPHATE
Franz Rodis, Gerhard Hartlapp, and Klaus Beltz, Knapsack, near Koln, Germany, assignors to Knapsack-Griesheim Aktiengesellschaft, Knapsack, near Koln, Germany, a corporation of Germany
Filed May 27, 1957, Ser. No. 661,718
1 Claim. (Cl. 23—107)

The present invention relates to a process and to a device for concentrating and drying solutions by atomization. The invention also provides for removing constitution water by spray-drying which, optionally, may involve a constitutional change of the treated chemical compound.

Drying by atomization is well known in the art. Atomization is usually brought about in a tower with the use of nozzles or various types of rotary plates, and the resulting fog is dried by the introduction of heated dry air. The air introduced was heated directly or indirectly and always outside the atomization tower.

Now, we have found that it is very advantageous to heat the dry air within the atomization tower.

The novel process consists in introducing by means of nozzles the solution or the substance used as starting material into a flame zone located above a fall zone, the flame zone forming the shell of a descending cone. The solution or the substance used as starting material is atomized from above into the interior of said flame cone.

As follows, the air necessary for drying is heated up within an atomization tower and the solution is atomized into a flame zone which is simultaneously used for heating the air.

In carrying out the process of this invention, it is advantageous to effect atomization in the center or above the center of the base of a descending flame cone, and preferably within a distance of said base that corresponds to about half the diameter of said base.

In the process of this invention, the air necessary for drying may completely or partially be sucked in through the flame zone. It may also be of importance to allow the atomized liquid to contact the flame only after having been distributed most finely. It is also possible to vary the time necessary for drying by changing the degree of distribution of the liquid. Finally, it is possible to effect heating with the use of waste gases emanating from furnaces used, for example, for the production of phosphorus or carbide.

The process and the device of this invention may be used for spray-drying for example aqueous chlorcalcium or sodium sulfate solutions and, more advantageously, for removing constitution water, for instance, in the production of crystalline alkali metal tripolyphosphate from alkali metal orthophosphate, an operation which even results in a constitutional change of the compounds treated. If the starting material used for the manufacture of alkali metal tripolyphosphate is an aqueous solution of orthophosphoric acid which contains corresponding amounts of soda, the solution is dried while, simultaneously, the constitution water is removed which implies a change in constitution.

The device used for carrying out the process of this invention comprises substantially a spraying tower in the upper part of which are arranged in a ring-shaped manner burners with descending openings facing each other in an angular position to form a cone-like flame zone. The device also comprises a spraying nozzle located within the center or above the center of the burners arranged in a ring-shaped manner.

According to a further feature of this invention, the burner openings may also be located on a common ring burner arranged in the upper part of the spraying tower. Finally, the distance of the spraying nozzle from the burner plane located below the latter may advantageously correspond to about half the diameter of the ring formed by the burners.

An exemplary device for carrying out the process of this invention comprises, for example, a ring burner with a descending flame zone; a nozzle arranged in approximately the same height or above the height of the burner plane; a spraying tower the upper part of which carries the ring burner and the nozzle; a cyclone for separating the dried material near the bottom of the tower; a heat exchanger for pre-heating the combustion air introduced into the tower over-head by means of the hot waste gases emanating from the tower and the cyclone; a suction blast apparatus for sucking off the waste gases from the tower and, optionally, for simultaneously sucking in the combustion air from the neighbourhood and a cooling aggregate for the final products.

The process of this invention may be carried out as follows, using a device as described above:

In the upper part of the spraying tower and below a spraying nozzle, there is produced by means of a ring burner or a similar element a cone-like descending gas flame through which is sucked the air necessary for drying which is introduced over the head of the tower. The nozzle may be arranged at the same height of the ring burner or advantageously above the latter in a distance corresponding to up to half the diameter of the ring burner. The nozzle atomizes the material to be dried or to be dehydrated directly from above or from behind into the flame cone. Care must be taken that the atomization jet does not strike the flame before having undergone a certain expansion. As follows, the nozzle must be kept at a certain distance from the flame cone, either by corresponding adjustment of the height of the nozzle or by varying the height of the flame cone which depends on the angular position of the burner openings. If the nozzle is located above the ring burner plane, the section laid through the atomization jet immediately above the ring burner in a vertical position to the atomization direction forms a cycle, the area of which may approximately correspond to the area formed by the ring, but is not allowed to exceed the latter. The atomization air emanating from the nozzle acts here as blast air whereby the temperature of the flame is considerably increased.

The advantage offered by the process and device according to this invention, as compared with the known processes, reside in a considerably more intense and rapid dehydration of the solution to be atomized which is insensitive to temperature, a dehydration which optionally may result in a removal of the constitution water or a constitutional change of the substance to be dried. The known atomization processes involved, however, no satisfactory results when used not only for evaporating adhering water but also and simultaneously for the removal of constitution water.

By the introduction of the dry air and the atomization jet through the flame of the ring burner according to this invention, the drops formed are especially well mixed with the dry air, which has an especially favorable effect upon the drying process.

A further advantage of this invention resides in a better utilization of the thermal energy. As a result of the arrangement of the ring burner in the interior of the atomization tower, the total amount of heat produced may be used for drying without losses occurring during the otherwise necessary heat transport.

The accompanying drawings represent diagrammatically a device suitable for use in carrying out the process of this invention.

Figure 1:
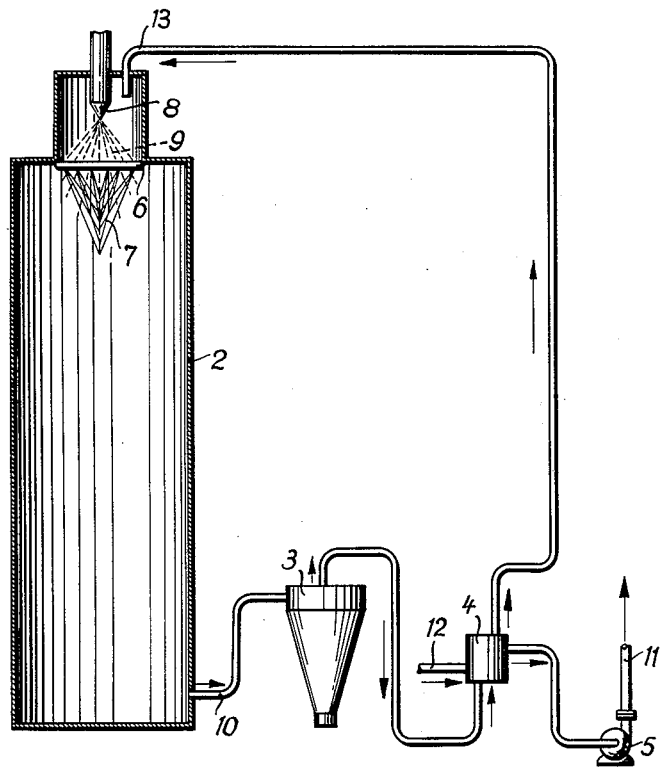
FIGURE 1 is a view partially in section of the apparatus.
Figure 2:
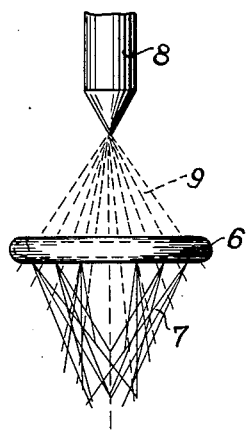
FIGURE 2 is a detail of the ring burner with nozzle.
Figure 3:
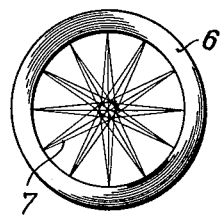
FIGURE 3 is a top view of the ring burner.

Referring to the drawings, the numerals designate the following parts: 2 is the atomization tower; 3 a cyclone; 4 a heat exchanger and 5 a suction blast apparatus. Ring burner 6 with flame zone 7 is located in the upper part of atomization tower 2. The material 9 to be treated is atomized through nozzle 8 into flame zone 7. The air necessary for drying is introduced from heat exchanger 4, through head supply line 13, through flame zone 7 into atomization tower 2. The cooling aggregate for the final product is not shown in the drawing.

The hot waste gases are sucked off together with the resulting final product through line 10 near the bottom of atomization tower 2 and, after having passed cyclone 3, they are conducted in heat exchanger 4 in countercurrent to fresh air sucked in over supply line 12. The cooled gases leave the device at 11.

The following examples carried out with the use of the above device serve to illustrate the invention, but they are not intended to limit it thereto:

Example 1

50 kg. of orthophosphoric acid containing 75% of $H_3PO_4$ and 34.5 kg. of anhydrous soda containing 98% of $Na_2CO_3$ are dissolved in 37.5 liters of water and atomized in a spraying tower with the use of a nozzle. The waste gases have a temperature within the range of about 350 to 400° C. Crystalline sodium tripolyphosphate is obtained in a yield of 98%; the product contains 57% of the total $P_2O_5$, of which 98% consist of $Na_5P_3O_{10}$.

Example 2

10 kg. of orthophosphoric acid containing 57% of $P_2O_5$ are mixed in the presence of 7.5 liters of water with 8.44 kg. of anhydrous soda consisting to 98% of $Na_2CO_3$. The resulting mixture is sprayed at a waste gas temperature of about 320° C. A crystalline product is obtained containing 53% of the total $P_2O_5$, of which 88.6% are sodium pyrophosphate. The rest to an extent of 100% is sodium tripolyphosphate. The yield is 98%.

Example 3

23 kg. of an aqueous solution of about 50° C. containing 13 kg. of chlorcalcium are sprayed in the course of 5 minutes. The solution is heated so that the waste gas leaves the tower with a temperature of about 400° C. The final product is obtained in a yield of about 13 kg. It contains 99% of $CaCl_2$, 0.5% of CaO, and 0.5% of $H_2O$.

Example 4

A solution consisting of 40% of sodium sulfate and 60% of water is sprayed at a rate of 8 liters per minute, the temperature of the waste gases being kept at about 250 to 300° C. Sodium sulfate is obtained with a yield of 99%. It is practically anhydrous.

The embodiments of the invention in which an exclusive property or privilege is claimed are defined as follows.

We claim:

A process for producing an alkali phosphate from an aqueous ortho-phosphate starting solution containing phosphate pentoxide and alkali oxide in a molar ratio of 1:2 to 3:5 comprising the steps of introducing said starting solution into the upper area of the spray-zone, atomizing said solution in said upper area of the spray-zone, simultaneously introducing drying air into the said upper area of the spray-zone, directing the atomized solution downwardly through a downwardly extending cone-shaped flame, setting the distance between the point of atomization and the base of the cone flame to about one-half the diameter of the base of said cone flame, collecting the phosphate in the said lower part of the spray-zone, discharging the phosphate from said lower part of the spray-zone, introducing the discharged phosphate and drying air in the form of waste gases into a separating zone, separating the phosphate from the drying air, passing the drying air in the form of waste gases into a heat exchanger, introducing fresh air into said heat exchanger to be warmed by the hot drying air passing through said exchanger, discharging the cooled drying air in the form of waste gases from said heat exchanger, and passing said hot fresh air as drying air to the point of introduction of said drying air in the said upper area of the spray-zone.

References Cited in the file of this patent

UNITED STATES PATENTS

| | | |
|---|---|---|
| 1,627,982 | Maguet | May 10, 1927 |
| 1,823,503 | Mittasch et al. | Sept. 15, 1931 |
| 1,884,894 | Sherwood | Oct. 25, 1932 |
| 1,907,838 | Leask et al. | May 9, 1933 |
| 2,109,811 | Welter | Mar. 1, 1938 |
| 2,471,749 | Howle | May 31, 1949 |
| 2,529,873 | Heller | Nov. 14, 1950 |
| 2,612,266 | Monick | Sept. 30, 1952 |
| 2,625,466 | Williams | Jan. 13, 1953 |